Oct. 18, 1949.  H. T. RITTER  2,484,909
COMBINATION FLOWERPOT AND SAUCER
Original Filed Aug. 26, 1942
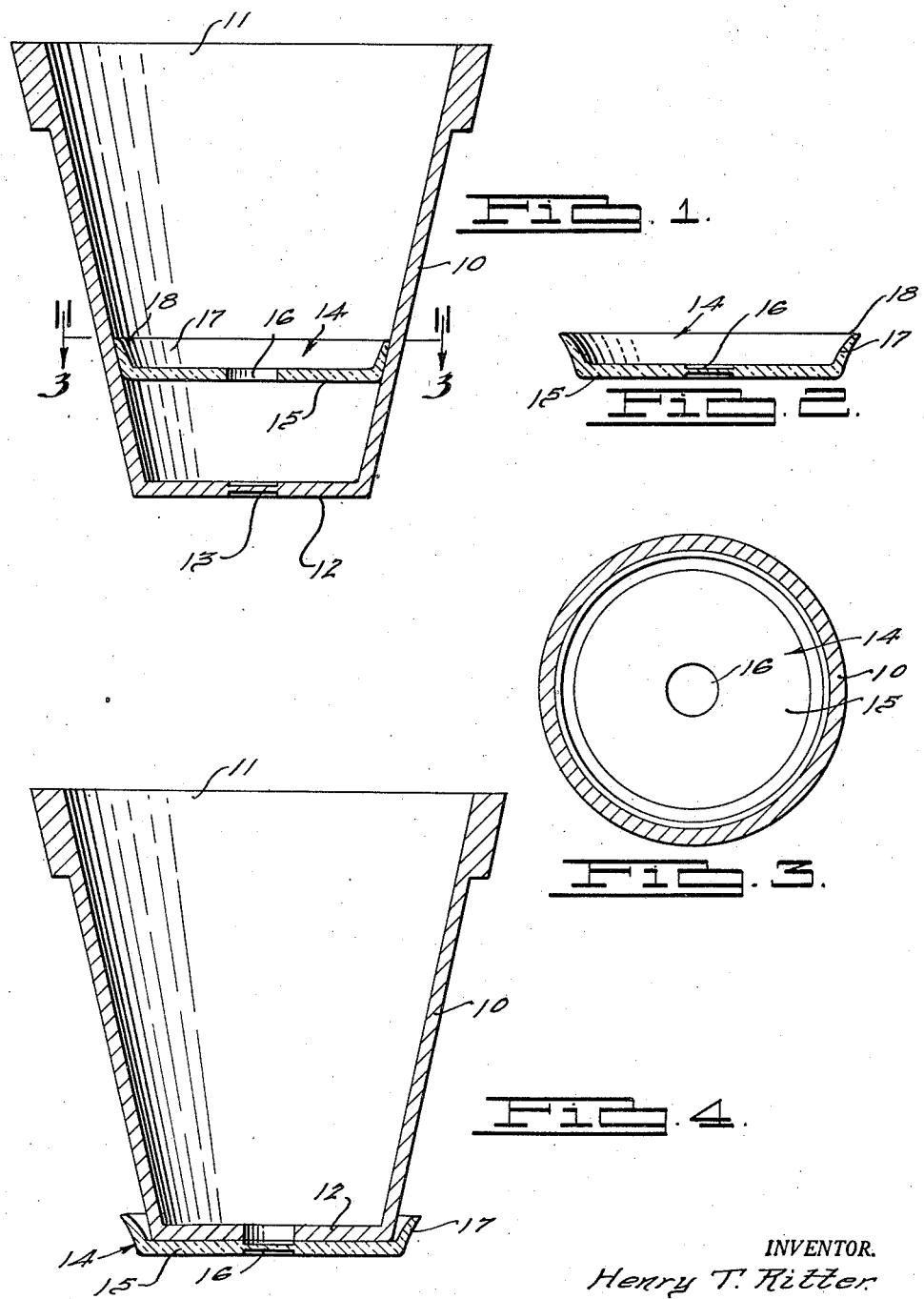
INVENTOR.
Henry T. Ritter
BY
Harness, Dickey & Pierce.
ATTORNEYS.

Patented Oct. 18, 1949

2,484,909

UNITED STATES PATENT OFFICE 2,484,909

COMBINATION FLOWERPOT AND SAUCER

Henry T. Ritter, South Rockwood, Mich.

Original application August 26, 1942, Serial No. 456,137. Divided and this application August 1, 1945, Serial No. 608,222

1 Claim. (Cl. 47—38)

This invention relates to flowerpots and particularly to a flowerpot in combination with an element which may be employed as a saucer in which the pot rests or as a partition within the pot above the pot bottom.

In the copending application of H. T. Ritter, Serial No. 456,137, filed August 26, 1942, which has become abandoned, a flowerpot is illustrated having therein a partition above the bottom for the purpose of forming a reservoir therebelow for the water which may drain from the soil supported on the partition. In this type of an arrangement, the saucer usually employed exteriorly of the pot for collecting moisture which may drain therefrom can be eliminated as the pot surface is coated to make it impervious to the passage of moisture.

The present invention is an extension of the inventive concept to be found in the copending application above mentioned, and embodies the use of a partition supported on the interior wall of the pot above the bottom thereof to function as a soil-supporting element through which the moisture contained therein may be drained. This partition element is so constructed that it may be employed as a saucer in which the pot may rest for collecting any moisture which may drain from the pot.

The partition and saucer element is preferably made from synthetic, resinous material of such shape that the side walls thereof may deflect slightly when engaging the inner surface of the pot so as to be securely anchored thereon. The side wall of the element forms the wall of the saucer extending about the bottom of the pot when the pot rests therein.

Both the partition and saucer element and the bottom of the pot may be provided with a wall portion of reduced thickness which may be broken out by the user of the pot from the element or pot, depending upon the use to which the element is put. If the element is employed as a partition, then the reduced wall portion thereof is broken out. If it is employed as a saucer, then the reduced wall portion in the bottom of the pot is broken out, so that in either instance the broken-out reduced wall portion forms a drain for the coil contained within the pot.

Accordingly, the main objects of the invention are: to provide a partition and saucer element which may be utilized as a partition within a flowerpot or as a saucer on which the pot may rest; to provide a partition and pot having an area of reduced thickness in the bottom thereof which may be broken out of one to permit the draining of moisture therethrough into the other; and, in general, to provide a partition and saucer element for a flowerpot which is simple in construction and economical of manufacture.

Other objects and features of novelty of the invention will be specifically pointed out or will become apparent when referring, for a better understanding of the invention, to the following description taken in conjunction with the accompanying drawing, wherein:

Figure 1 is a sectional view of a flowerpot and a partition and saucer element disposed within the pot and forming a partition therein;

Fig. 2 is a sectional view of the partition and saucer element illustrated within the pot of Fig. 1, with the wall portion of reduced thickness unbroken;

Fig. 3 is a sectional view of the structure illustrated in Fig. 1, taken on the line 3—3 thereof; and Fig. 4 is a view of structure, similar to that illustrated in Fig. 1, with the partition and saucer element supporting the flowerpot which has its wall of reduced thickness removed.

The flowerpot 10 is of conventional form having a smooth, truncated conical inner surface 11 and a bottom 12 which is herein illustrated as being provided with an area of reduced thickness 13 in the center thereof.

A partition and saucer element 14 is illustrated as being mounted within the pot and secured to the inner surface 11 thereof by frictional engagement. The element 14 is illustrated in Fig. 2 as having a bottom portion 15 containing an area of reduced thickness 16 and having an upwardly directed side wall 17 which reduces in thickness toward the edge 18 thereof to provide a degree of flexibility thereto. As illustrated in Fig. 1, the element 14 is placed within the pot and forced downwardly therein to have the edge 18 of the side wall 17 forced inwardly under pressure to thereby securely anchor the element within the pot on the inner surface 11 thereof.

It will be noted in Fig. 1 that the area of reduced thickness 16 has been broken out so that an aperture is provided through the bottom 15 of the element 14 which functions as a drain opening to permit the moisture in the earth resting thereon to drain into the bottom of the pot which forms a reservoir. The outer surface of the pot, at least at the bottom portion thereof, is glazed, enameled, or otherwise coated so as to be impervious to the passage of moisture, so that the moisture collecting in the bottom of the pot will not pass therethrough.

In Fig. 4 the element 14 is illustrated as being employed as a saucer in which the pot 10 rests. In such an arrangement the material in the area 13 of reduced thickness is broken from the bottom 12 of the pot to permit the moisture in the earth in the pot to drain through the resulting aperture into the saucer element 14 in which the water collects. The element 14 may be made of any material such as metal, ceramic, moulded resins and the like. It was found that the moulded resins provided a light, colorful element which could be employed satisfactorily both as a partition as well as a saucer.

The partition and saucer element is employed in combination with a flowerpot either as a partition therewithin or as a saucer in which the flowerpot rests. Both the flowerpot and the element are impervious to moisture and the bottoms thereof have an area of reduced thickness which may be readily broken to provide a drain opening. When the element is employed as a partition, as illustrated in Fig. 1, the area of reduced thickness is broken from its bottom so that the moisture may be drained therethrough into the bottom of the pot. When the element is employed as a saucer, as illustrated in Fig. 4, then the area of reduced thickness is broken from the bottom of the pot to permit the moisture to pass from the bottom into the saucer. The element is shipped within the pots which are stacked in the usual manner without interference so as to reduce the shipping space required if the elements were shipped separately or interfered with the stacking feature of the pot.

What is claimed is:

The combination with a flowerpot, of a partition and saucer element having a bottom from which side walls project upwardly and an area in the bottom of reduced thickness, the side walls being so disposed as to engage the inner surface of the pot to support the bottom above the bottom of the pot or which may form the walls of a saucer when the bottom of the pot rests upon the bottom of the element.

HENRY T. RITTER.

REFERENCES CITED

The following references are of record in the file of this patent:

UNITED STATES PATENTS

| Number | Name | Date |
|---|---|---|
| 1,810,236 | Bender | June 16, 1931 |
| 2,238,132 | Ritter | Apr. 15, 1941 |
| 2,253,817 | Simmons | Aug. 26, 1941 |

FOREIGN PATENTS

| Number | Country | Date |
|---|---|---|
| 5,548 | Great Britain | 1912 |